UNITED STATES PATENT OFFICE.

JOHANN JAKOB BRACK, OF BASLE, SWITZERLAND, ASSIGNOR TO BASLE CHEMICAL WORKS, OF SAME PLACE.

RHODOL DERIVATIVE.

SPECIFICATION forming part of Letters Patent No. 625,536, dated May 23, 1899.

Application filed February 11, 1899. Serial No. 705,335. (Specimens.)

*To all whom it may concern:*

Be it known that I, JOHANN JAKOB BRACK, chemist, a citizen of the Swiss Republic, residing at Basle, Switzerland, have invented a new Rhodol Derivative, of which the following is a clear and complete specification.

In the Letters Patent No. 613,113, dated October 25, 1898, I have described a dyestuff of the phthalein series obtained by condensing the ethyl ether of dimethylrhodol with formic aldehyde.

Ever since I have found that by condensing the methyl ether of dimethylrhodol with formic aldehyde an analogous dyestuff is obtained which is much more solid against light and yields in printing tints which are thirty to forty per cent. more intense than those obtained with the dyestuff derived from ethyl ether of dimethylrhodol and formic aldehyde. This dyestuff derived from methyl ether of dimethylrhodol and formic aldehyde may be prepared as follows: To a solution of thirty kilograms of the methyl ether of dimethylrhodol in one hundred and eighty kilograms sulfuric acid of 66° Baumé I add a mixture of ten kilograms formic aldehyde of forty per cent. and fifty kilograms sulfuric acid of 66° Baumé. The reaction sets in at once and is marked by a rise of the temperature of the solution. To complete the reaction, I allow the solution to stand for twenty hours at the ordinary temperature, and afterward I pour it on ice, (two hundred to two hundred and fifty kilograms.) The product of condensation is separated by a solution of common salt as a vermilion precipitate, which is separated by filtration, pressed, and dried. In its dry form the product of the reaction appears as a vermilion powder. It dissolves in dilute acetic acid and dilute alcohol with an orange-red tint. The color of its solution in concentrated sulfuric acid is yellowish brown and turns to orange red by addition of water. In dyeing and printing this dyestuff offers the same advantages as the dyestuff derived from ethyl ether of dimethylrhodol described in the Letters Patent No. 613,113. It dyes tannin-mordanted cotton a yellowish red, and on printing with ferrocyanid of potassium and oxid of zinc it yields a lake of the same yellowish-red color, which is not changed by steaming.

What I claim as my invention, and wish to secure by Letters Patent, is—

As a new article of manufacture, the herein-described dyestuff of the phthalein series, derived from methyl ether of dimethylrhodol and formic aldehyde, the same being a vermilion powder, which dissolves in dilute acetic acid and dilute alcohol with an orange-red color and in concentrated sulfuric acid with a yellowish-brown tint, turning to orange-red by addition of water, can be separated from its solutions as a vermilion precipitate, dyes tannin-mordanted cotton a yellowish red, and on printing with ferrocyanid of potassium and oxid of zinc, yields a lake of the same yellowish-red color, which color is not changed by steaming.

In witness whereof I have hereunto signed my name in the presence of two subscribing witnesses.

JOHANN JAKOB BRACK.

Witnesses:
GEORGE GIFFORD,
AMAND RITTER.